US006698737B1

(12) United States Patent
Blessing

(10) Patent No.: US 6,698,737 B1
(45) Date of Patent: Mar. 2, 2004

(54) CLAMPING JIG

(76) Inventor: Ronald Lee Blessing, P.O. Box 574, Dallas, OR (US) 97338

( * ) Notice: Subject to any disclaimer, the term of this patent is extended or adjusted under 35 U.S.C. 154(b) by 0 days.

(21) Appl. No.: 10/320,037

(22) Filed: Dec. 14, 2002

(51) Int. Cl.[7] .................................................. B23Q 1/25
(52) U.S. Cl. .............................. 269/55; 269/57; 269/16
(58) Field of Search .............................. 269/16, 55, 57, 269/63, 67, 68, 69, 71, 81, 82, 83, 85; 408/90

(56) References Cited

U.S. PATENT DOCUMENTS 3,872,760 A * 3/1975 Desnoyers, Jr. .............. 83/743
3,941,364 A * 3/1976 Hjelm et al. ................ 269/156
4,056,136 A * 11/1977 Miller ..................... 144/154.5
4,237,796 A * 12/1980 Gordon et al. ................ 108/22
4,901,988 A * 2/1990 Wright et al. ................. 269/16
5,206,980 A * 5/1993 Chapman ..................... 29/237
5,346,194 A * 9/1994 Coffin, III ................... 269/166

* cited by examiner

*Primary Examiner*—Lee D. Wilson
*Assistant Examiner*—Daniel Shanley
(74) *Attorney, Agent, or Firm*—Carl D. Crowell

(57) ABSTRACT

A clamping jig particularly adapted for use with elongate work pieces. The jig has an elongate work face, a work stop abutment the length of the work face, a plurality of toggle clamps affixed to the work face. One or more elongate or linear work pieces to be worked are positioned on the work face and held in place by the work stop abutment. The plurality of toggle clamps may be used to either hold the work piece in place or hold one or more additional work pieces to the first work piece. The work face or faces are rotatable around the elongate axis. Each toggle clamp has a toggle clamp arm with which the toggle clamp is set. On rotation of the work face, an actuating bar engages the toggle clamp arms to release the toggle clamps for removal of the work piece.

2 Claims, 3 Drawing Sheets

CLAMPING JIG

BACKGROUND AND SUMMARY OF THE INVENTION

The present invention relates generally to a linear clamping jig, and more particularly to a clamping jig for clamping one or more linear members to be worked or into a predetermined relationship with one another for such as gluing.

Work pieces whether painted or glued often must set for a period of time waiting for glue or paint to dry. Jigs holding drying and setting work pieces take valuable space and often must be moved out of the way to permit other work to be done. Other alternatives include having workspace to accommodate multiple jigs, which is expensive requiring additional equipment and space. It is a desirable quality met by the present invention to overcome these issues.

The present invention, by having multiple rotating work faces, permits a work piece to be clamped, worked or glued, adjusted as necessary, then rotated in a clamped position so that a new work face is presented for additional work pieces without additional equipment or space needed. The present invention provides additional utility in providing a means for releasing the work piece once it is ready to be removed from the jig.

The disclosed clamping jig is adapted to support a plurality of parallel linear members and to maintain the members in alignment with each other. The jig is operated with the placement of a work piece in a retaining groove or against a stop abutment which runs the length of a work face. The work piece is held in place by a series of manually operated toggle clamps along the length of the work face. The toggle clamps may be used to retain the work piece, or to secure a second work piece to the first work piece to permit gluing. The toggle clamps are of a common type with a toggle arm and a clamping head that may be adjusted.

While the jig may be of any length, it will be generally most useful in lengths of greater than eight feet with toggle clamps preferably placed at intervals of four inches to one foot.

The specific benefits of the present invention relate to the method of toggle clamp release and to the ability to work multiple work pieces on a single jig. The preferred embodiment is comprised of three elongate work faces displaced around an axis or axle that runs the length of the work faces to create a jig assembly. When a project requires two elongate work pieces to be glued, a first work piece is placed on the work face and held by a work stop abutment. The second work piece may then be placed in proper relation to the first work piece. Fine placement for the length of the work piece may be achieved by aligning a portion of the two work pieces before setting the toggle clamp proximate the aligned portion. The benefit of a series of clamps includes the ability to realign a small portion of the two work pieces prior to any glue setting and then resetting the toggle clamp or clamps proximate the adjustment without disturbing the balance of the work pieces. Once the work piece or pieces are set and clamped any additional work needed may be done on the piece or pieces, including finishing or painting.

The jig assembly is mounted in a holder or mount, which permits axial rotation. The holder may be a simple bracket that receives the axle through the core of the invention. A rotating means is provided which may be electrically or operator powered. A simple wheel mounted on one end may be used, however it is preferred to have a geared ratcheting arm or similar means to ease rotation. It is also preferred to have a pin or other locking mechanism to lock the jig and prevent rotation when work pieces are being clamped into the jig or worked.

Placed proximate the back of the jig is an actuating arm, which engages the toggle arms of the toggle clamps when they are rotated past the actuating arm. When the set toggle clamps pass the actuating arm, the toggle clamp arms are contacted and displaced, releasing the clamps and the work piece held. In the preferred embodiment, the actuating arm is placed at an angle relative to the work faces and the line of toggle clamps. Such an angled placement provides that on rotation, the toggle clamp arms impact the actuating arm sequentially. This reduces the maximum force required to release the toggle clamps, in effect, unzipping the toggle clamps down the length of the work face.

The befits of this invention as disclosed herein include the ability to set a work piece or work pieces, glue or work the pieces, then rotate the pieces out of the way to permit a new work face to be available for additional work pieces. Further advantages are found in the actuating arm that releases the toggle clamps on rotation.

With a series of three work faces placed on an axle, two faces may contain setting or drying work pieces while a third piece is being set or jigged. Depending on the work to de done, the invention allows that when any one piece is completely clamped into the jig, and any work finished, the next work face contains a work piece that is set or dry and ready to be removed. Any locking pin is removed. The jig is then rotated permitting the actuating arm to engage the plurality of toggle arms and release the toggle clamps. Then the set or dried work piece is removed leaving a ready jig for a new work piece. Further benefits include the ability to quickly set all toggle clamps to an open position for receiving a work piece if the work face is otherwise empty.

For projects that require significant set or drying times relative to the jigging and work time, jigs of four, five or even a greater number of work faces may be utilized.

The foregoing and other benefits, features and advantages of the present invention will be more readily understood upon consideration of the following detailed description of the invention taken in conjunction with the accompanying drawings.

DETAILED DESCRIPTION OF THE PREFERRED EMBODIMENT

Figure 1:
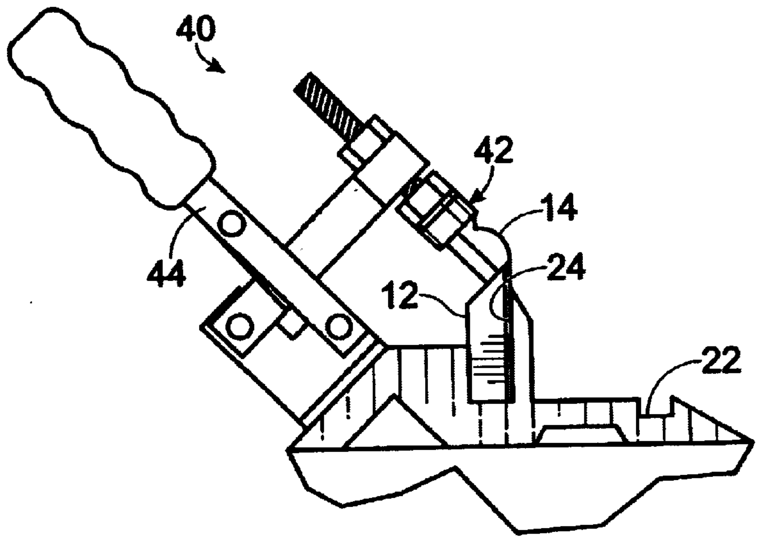
FIGS. 1–3 Depict a single work face of the invention with the toggle clamp first engaged, then disengaged, then with the work piece being removed.

Referring to the drawings, the various views of the invention retain their element indicators throughout the figures. Select elements are indicated with multiple indicators where distinction in configuration is depicted.

Figure 2:
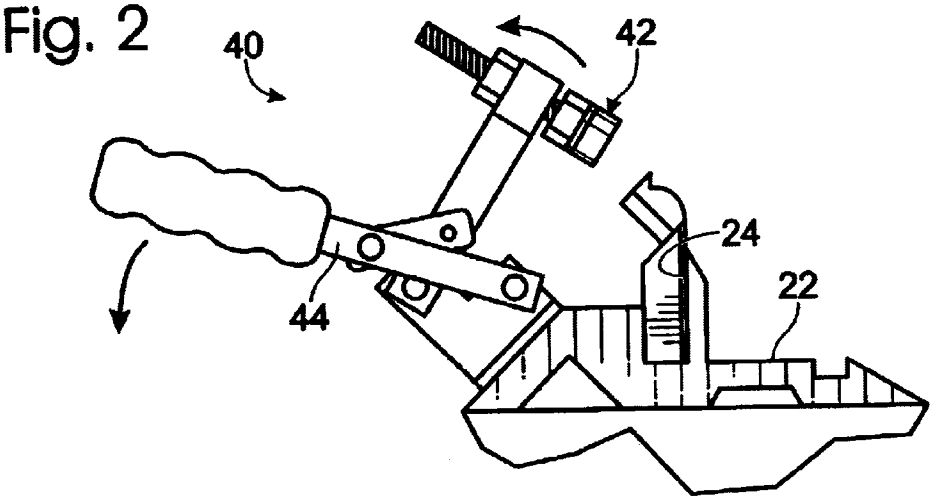
Figure 3:
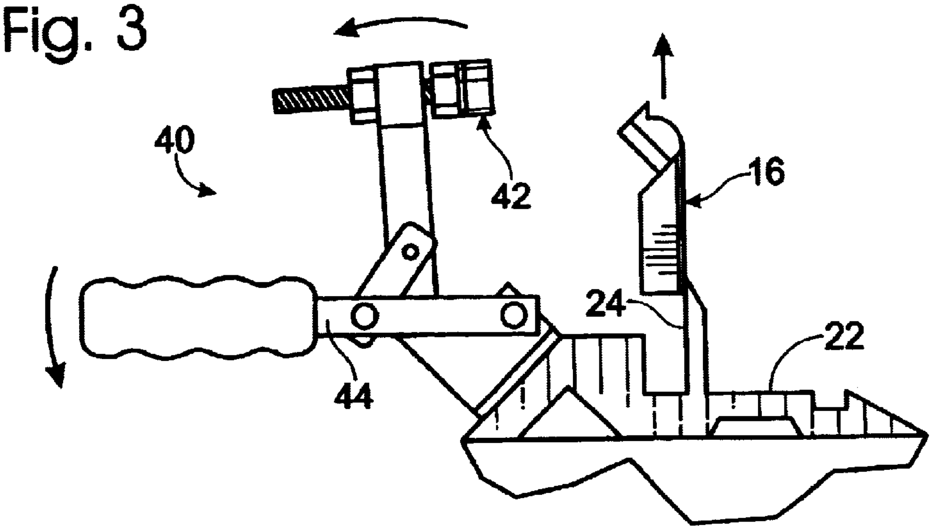
Figure 5:
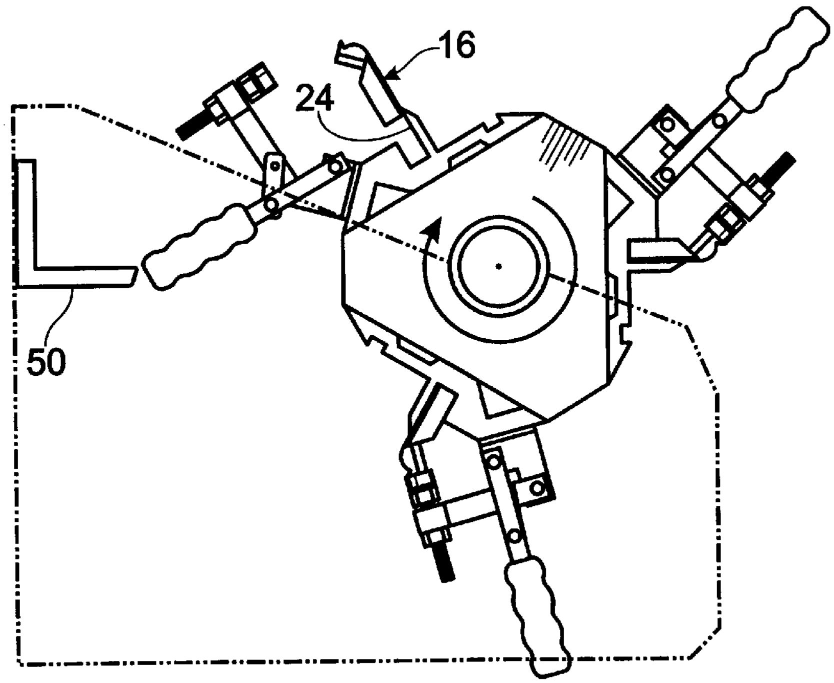
Figure 6:
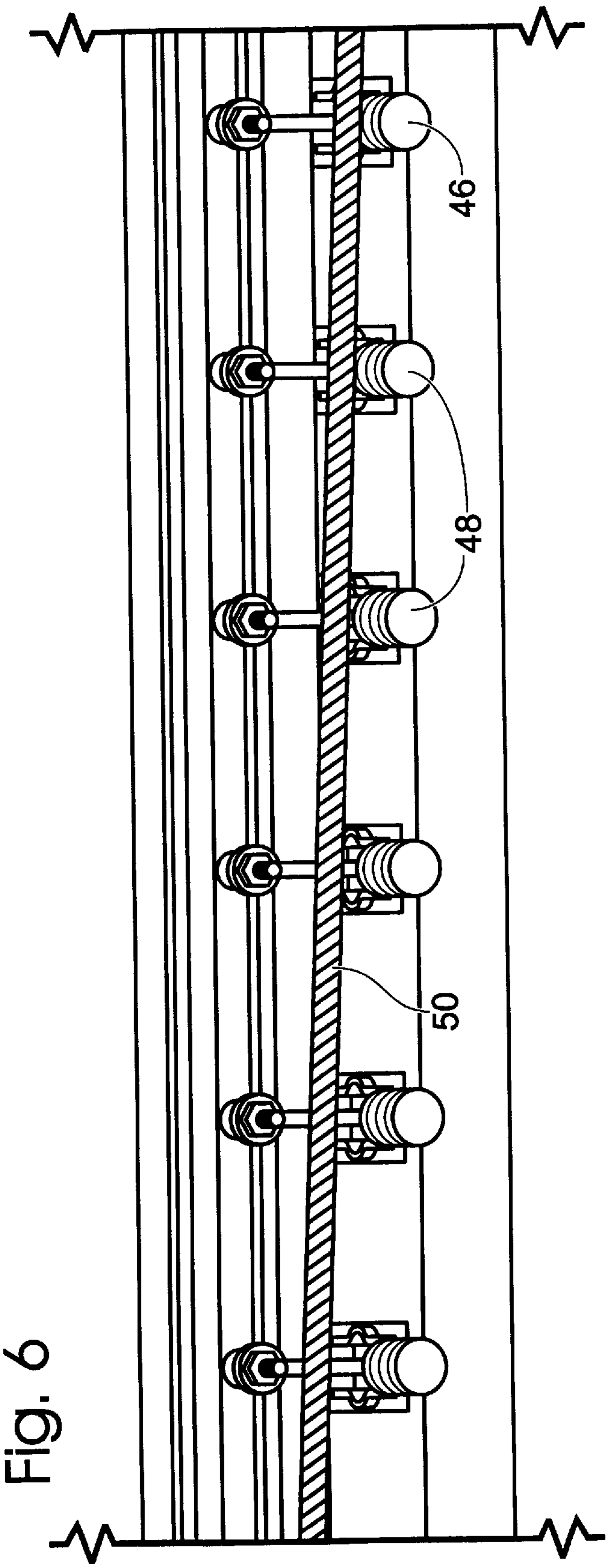
FIG. 6 is a sectional view of the invention along line 6 of FIG. 4 depicting the angled actuating bar relative to the toggle clamp arms.

The invention relates to a linear clamping jig depicted in FIGS. 1–3 with a work face 22 and a series of toggle clamps 40 to hold a work piece 12 in place to be worked or for gluing to a second work piece 14. As depicted in FIGS. 5 and 6, in the preferred embodiment, the jig assembly is comprised of multiple work faces 22, 26, 28 all set with toggle clamps 40, 46, 48.

The work faces 22, 26, 28 are all disposed around and affixed to an axle or core 30. The work faces may comprise the primary structure of the jig or may be supported by a support such as an axle 30. The axle 30 is set in a bracket or other holder to permit rotation of the jig assembly. Rotation is accomplished through any number of means, not depicted. Rotation means may include a simple wheel operatively affixed to the axle or a gear assembly. Motive force for rotation may be electromechanical or operator powered. Though not depicted, the preferred embodiment consist of a simple geared ratchet assembly with a locking pin to lock the work faces 22, 26, 28 when jigging a work piece 12 or working on a work piece 12.

The jig itself is a linear jig with toggle clamps 40, 46, 48 placed along the length of the jig as depicted in FIG. 6. The invention is preferably greater than eight feet in length, though the utility of the invention is independent of length. Spacing of the toggle clamps 40, may be of any distance with the preferred embodiment having a spacing of four inches to one foot. Working with work pieces 12 of greater rigidity generally permits greater spacing. Working with work pieces 12 that require greater pressure will generally require greater frequency of toggle clamps 40.

Figure 4:
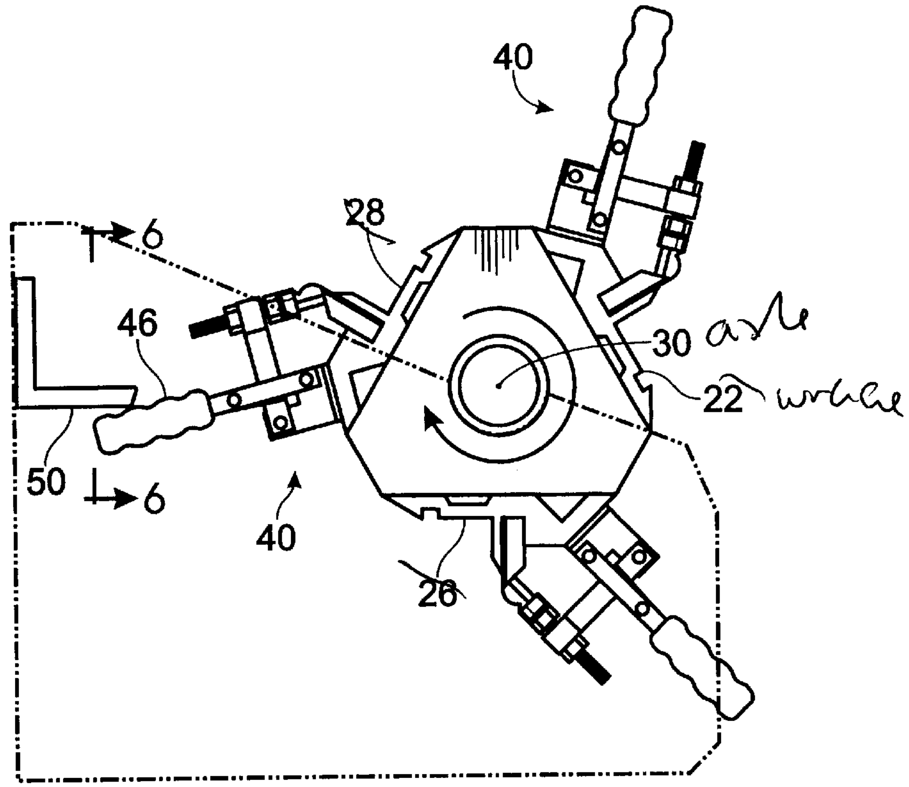
FIGS. 4–5 Depict a cross section view of the invention depicting the engagement of a toggle clamp arm with the actuating bar and then the released or disengaged toggle clamp.

Mounted proximate the jig assembly is an actuating bar 50 to engage the various toggle arms 44 when the jig assembly is rotated as depicted in FIGS. 4 and 5.

Operation

As depicted in the preferred embodiment, the clamping jig is comprised of three work faces, 22, 26, 28. Each work face 22 has a work stop abutment 24 running the length of the work face 22 for retaining a work piece 12. Toggle clamps 40 spaced the length of the work face 22 are actuated by a toggle arm 44 to retain a work piece 12 or hold a second work piece 14 to a work piece 12 for gluing with a clamp head 42.

As depicted in FIG. 1., in preferred use, a work piece 12 is placed on the work face 22 and held in place by a work stop abutment 22. A second work piece 14 is glued to the work piece 12 and held in place by a clamp head 42.

As depicted in FIG. 2, when any work to be done is completed, such as painting or finishing, or when glue used to bond a work piece 12 to a second work piece 14 is set or dry, the toggle arm 44 is actuated to raise the clamp head 42 releasing and pressure on the work piece 12 or finished piece 16. The finished piece 16 may then be removed, leaving the work face 22 ready for use as depicted in FIG. 3.

Placed proximate the jig assembly is an actuating bar 50 depicted in FIGS. 4–6. The actuating bar preferably is placed at an angle to the axle 30 of the jig assembly and such that on rotation of the assembly, the toggle arms 44, of the toggle clamps 40, 46, 48 are actuated by the actuating bar 50. As depicted in FIG. 6, the angled actuating bar 50 impacts the toggle arms, 44 of the toggle clamps 46, 48 sequentially such that as a first toggle arm 44 of a first toggle clamp 46 is actuated, no pressure is applied to subsequent toggle arms 44 of subsequent toggle clamps 48 permitting a zipper effect, limiting the total amount of force that need be applied at any one time.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A clamping jig for working on elongate work pieces comprising, a one or more work face elongate along an axis affixed to a support to permit the rotation of said one or more work face about said axis, a rotating means to axially rotate said one or more work face, said one or more work face set with a work stop abutment, attached to said one or more work face a plurality of toggle clamps each with a clamp head and a toggle arm, proximate said support and said one or more work face an actuating bar positioned so as to engage said toggle arms on rotation of said work face.

2. The clamping jig of claim 1 wherein said actuating bar is set so as to engage said toggle arms sequentially on rotation of said one or more work face.

* * * * *